Nov. 5, 1968 D. D. CALL 3,409,350

LENS STABILIZATION SYSTEM

Filed July 12, 1965

Inventor:
Daniel D. Call.
By Griffin and Branigan
Attys

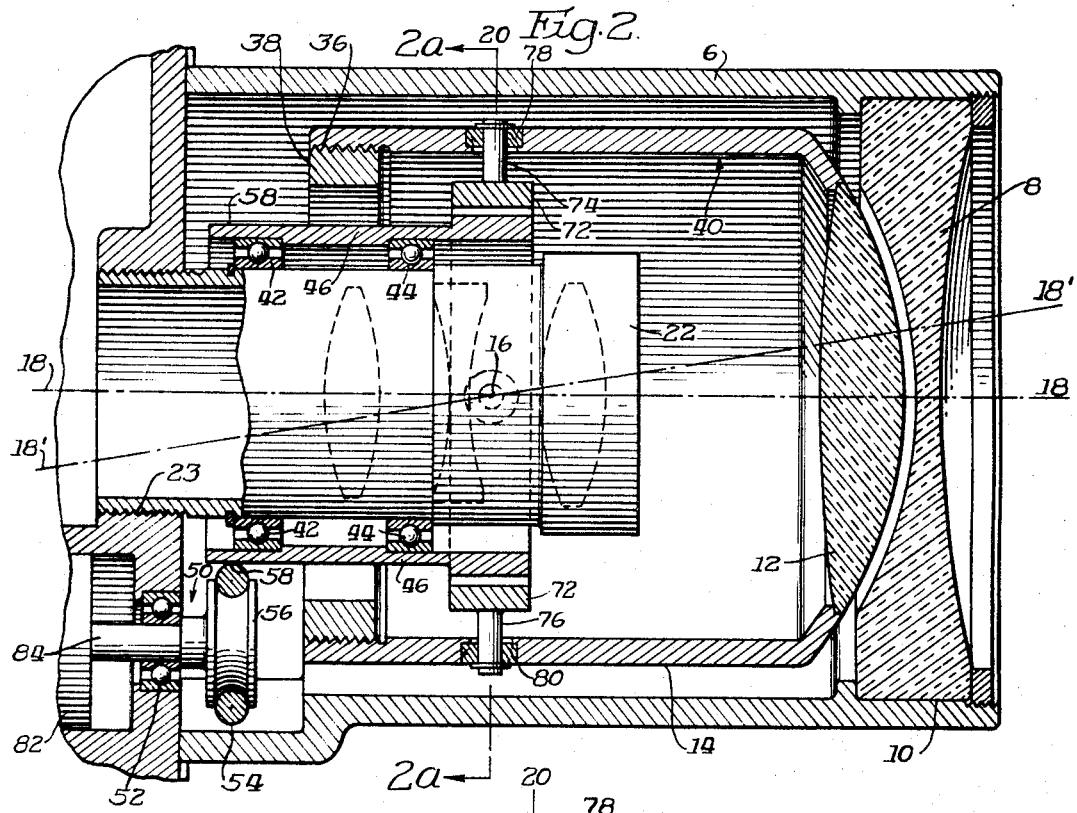
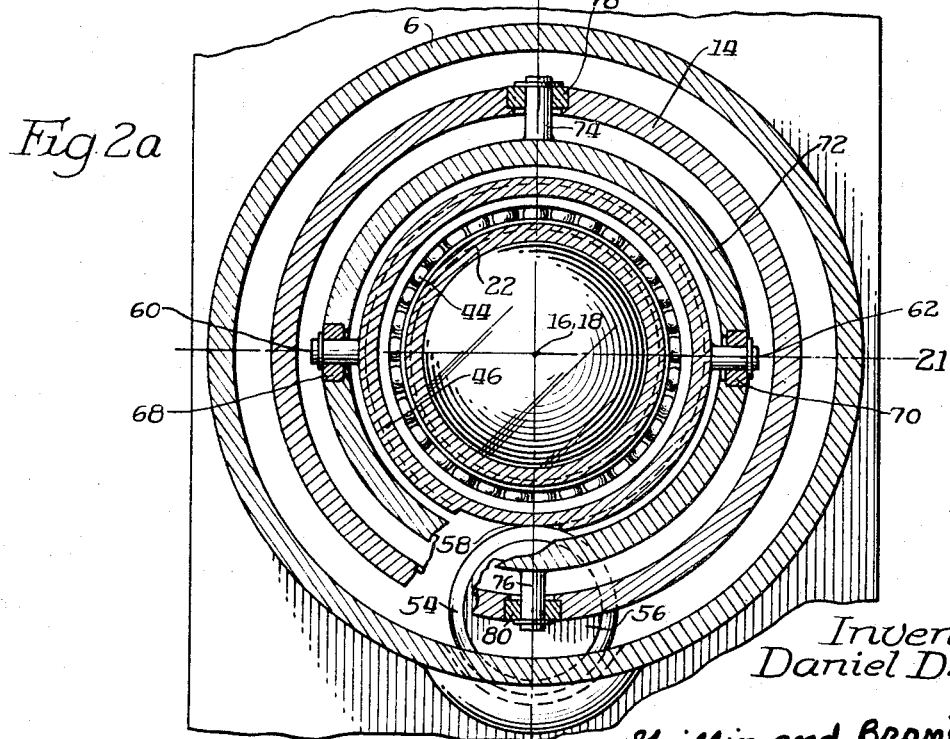

United States Patent Office 3,409,350
Patented Nov. 5, 1968

3,409,350
LENS STABILIZATION SYSTEM
Daniel D. Call, Elk Grove Village, Ill., assignor to Bell & Howell Company, Chicago, Ill., a corporation of Illinois
Filed July 12, 1965, Ser. No. 470,966
22 Claims. (Cl. 352—140)

ABSTRACT OF THE DISCLOSURE

A lens stabilization system wherein the lens is mounted on a rotor so that spin axis of the rotor corresponds with the lens' optical axis. The rotor is pinned to a gimbal suspension system which is rotated by a drive means. In this manner, as the gimbal suspension system is spun, the lens spins about a spin axis at substantially the same speed as the gimbal system.

---

This invention relates to stabilized optical systems and more particularly to a mechanism for stabilizing the lenses of cameras, telescopes, field glasses, or other optical instruments against vibratory motions.

Whether optical instruments are hand held or mounted upon a platform which is subjected to vibratory motion, the lenses thereof are generally unavoidably vibrated, thereby resulting in an undesirable image at the focal plane. This is particularly true in the case of a movie camera where vibrations are recorded on successive frames of film which, when magnified during projection, produce a picture which is unpleasant to view and in some instances unintelligible. It is an object of this invention, therefore, to provide a lens stabilization system wherein undesired vibrations are eliminated from the image at the instrument's focal plane, whether they be caused by an operator or a vibrating platform.

It is a more particular object of the invention to provide a movie camera that will produce a stable, non-vibratory picture whether the photographer takes pictures while walking, riding in a car, or even flying in an aircraft in which case the camera is subjected to both severe aircraft vibrations as well as the normal jiggle introduced by the photographer. The invention, however, is not limited to the field of hand held movie cameras. It also has great utility in other fields such as military optical instruments. For example, the Navy has refrained from using high powered binoculars because the users thereof have been unable to hold the binoculars sufficiently stable to focus upon the object which it is desired to view. The Naval forces have even been unable to make full use of the recent developments in the area of telescopic zoom lenses. Again, this is because the users have been unable to focus on the desired object during high zoom lens magnification. This is so even when the binocular or telescope is not hand held, but rather fastened to a bracket rigidly mounted to the ship for example.

The invention also has wide use in the field of aerial photography where stabilized moving pictures are rare indeed. Similarly, ground monitored visual guidance systems for missiles have generally proved ineffective because the image received by the ground monitoring station has been too unstable for an operator to accurately detect a target. The system of the invention remedies this situation. In addition, the invention has great utility for use in observational devices currently being used by the Army in tactical and reconnaissance aircraft. For example, the Army has recently experienced difficulties with its helicopter gunners losing sight of a target as soon as the guns are fired. That is, the vibrations from the guns cause related optical sighting systems to jiggle so much that the operator cannot focus on the target. In fact, it is for this reason that many land based anti-aircraft weapons have the sighting systems thereof sufficiently removed from the gun mounting that the gun vibrations do not interfere with the optical sighting mechanisms. By using an optical stabilization system in accordance with the instant invention an operator's ability to visually focus on a desired object is not impeded by platform vibrations. Hence, the sighting mechanism can be located at the gun mount.

It has previously been suggested that a lens be suspended in a fluid contained within a sphere. By spinning the sphere about a given axis, the swirling fluid causes the lens to rotate and, in effect, act as its own gyro whereby it would be stabilized against motion away from its spin axis. Attempts have been made to apply this concept to lens stabilization systems, such as in movie cameras for example. These attempts however, have brought to light many practical engineering problems which, commensurate with simplicity and economy of manufacture, render the concept impractical. For example, an entire sphere is required; the stabilization of the system is dependent upon viscosity changes with temperature; leakage problems are often encountered; humidity problems lead to odd optical effects upon a resulting image; and in order to prevent wobble of the lens the inner surface of the driving sphere has to be almost perfectly spherical. Accordingly, it is an object of this invention to provide a lens stabilization system that has the attributes of the floating lens structure but does not have its engineering drawbacks.

It is another object of this invention to provide a lens stabilization system that not only compensates for instrument vibrations but is also of the "self-erecting type". That is, the device has a characteristic that the rotor's spin axis will automatically follow and strive steadily to align itself with the axis of its driving member so that the lens always tends to become aligned with the instrument. One means for accomplishing this is to mount the lens which it is desired to stabilize on a spherically surfaced member and then rapidly spin the spherically surfaced member by a rotatable drive means in frictional contact therewith. In this manner, as in the fluid system, the lens itself acts as its own stabilizing means. That is, once the lens is rotated at a sufficiently high speed about its spin axis, its angular momentum causes the lens to tend to resist motion away from that spin axis. However, when the axis of the drive means changes its position relative to the spin axis of the lens the frictional forces between the drive means and the spherical surface cause the lens— acting as the rotor of a gyroscope—to precess so that the spin axis of the lens realigns itself with the drive axis of the drive means. This type of device, although quite suitable in most of its applications has certain drawbacks which limit its use. For example, when the optical instrument with which it is associated is subjected to very large amplitude vibrations the stabilized lens has a tendency to nutate. This problem can be solved by increasing the friction between the drive means and the spherical surface. This, however, renders the lens stabilization system less sensitive to high frequency vibrations of a lower amplitude. Consequently, it is another object of this invention to provide a lens stabilization system wherein the stabilized lens is not only free from nutational tendencies but is also sensitive to high frequency, low amplitude vibrations.

Another drawback of the above described frictionally driven spherically surfaced system is that there is sometimes a substantial time lag between the time the drive means is first rotated and the time that the stabilized lens is up to speed. In the case of home movie cameras or binoculars, for example, it is most desirable that the lens stabilization system be immediately operative. It is another object of this invention, therefore, to provide a lens stabilization system wherein the stabilized lens thereof is operatively stabilized at almost the instant that the operator turns the device on. In other words, it is an object of the invention to provide a stabilized lens system that has no "warm-up" period.

Most gyroscopic devices have a rotor thereof mounted in a set of gimbal rings whereby the rotor is more or less freely suspended with respect to some surrounding housing mechanism. Usually, the gimbal suspension system is held relatively stationary with respect to the housing. In this case a sudden jarring force upon the system can cause the rotor to nutate. That is, the rotor undergoes what has been referred to as "infinite precession" or, in other words, precession caused by precession. This tendency of a rotor to nutate is overcome in the instant invention by spinning the gimbal suspension mechanism itself. In this manner, the rotation of the gimbals is imparted to the rotor through the gimbal pivots. Hence, there is no relative rotation about the spin axis between the gimbals and the rotor and therefore no tendency for the rotor to nutate with respect to the gimbal rings.

Gimbal rings have been rotated in the past in order to obtain friction erection of the rotor within the gimbal rings. This type of friction erection whereby the rotor is erected by means of friction couples at the gimbal pivots is described, for example, in a U.S. Patent 1,308,783 to J. and J. G. Gray entitled, "Gyroscopic Apparatus," which issued on July 8, 1919. In that case, however, although gimbal pin friction is used to erect the rotor, there is still relative rotation about the rotor's spin axis between the rotor and the gimbal suspension whereby the rotor still retains its nutational tendencies. In the instant invention, the advantages of gimbal pin erection are retained while the nutational tendencies are eliminated.

In accordance with the principle of the invention, a lens is mounted on a rotor so that the spin axis of the rotor corresponds with the lens' optical axis. The rotor is then pinned to a set of gimbal rings and the entire structure is rotated about the spin axis by a drive means connected to the gimbal ring farthest from the rotor.

In this manner rotation of the drive means is directly transmitted to the rotor through the gimbal pivots. The lens, therefore, is spun about its spin axis whereby the lens' angular momentum causes it to tend to resist motion away from the spin axis. However, when the axis of the drive means changes its position relative to the spin axis of the lens the gimbal pivot friction causes the lens—acting as the rotor of a gyroscope—to precess so that the spin axis of the lens realigns itself with the drive axis of the drive means.

By mounting the drive means and the rotatable lens structure within the housing of an optical instrument so that the drive means is rigidly rotatable within the instrument, the lens is effectively a gyro freely suspended within the instrument. Hence, although the instrument may be subjected to external vibrations the lens remains substantially stable in space. On the other hand, if the instrument is relatively slowly rotated such as, for example, when a photographer pans a camera, the lens acting as a part of a gyro rotor tends to precess so as to follow this slow motion of the instrument. Consequently, the rotating lens, although not sensitive to undesired vibrations, within practical limits follows intentional motion of the instrument.

By mounting a mating lens in the housing in front of the rotating lens so as to form a Boscovich type of wedge an image, viewed through the wedge and a focusing lens, remains stable at the focal plane of the focusing lens irrespective of the motion between the wedge elements. A wedge of this type is more fully described and explained in U.S. Patent No. 2,180,217 entitled "Camera with Range Finder" and issued to Carl Ort on November 14, 1939. In this manner, this image at the focal plane of the focusing lens remains stable even though the housing of the optical instrument is subjected to undesirable vibrations. Moreover, when the instrument is panned relatively slowly the stabilized lens structure, by virtue of its precessive ability, is adapted to have the image of the thusly panned subject stably appear at the instrument's focal plane.

By providing a means for increasing the friction at the gimbal pivots the precessional forces on the rotor are increased so that the rotor precesses at a more rapid rate, thereby permitting the operator to pan more rapidly and still have the image of the desired object appear on the instrument's focal plane.

An advantage of the instant invention is that it is a relatively simple device which is quite easily manufactured, susceptible to large tolerances, and therefore capable of being manufactured at low cost. Additionally, the entire structure may be housed in a volume of cylindrical shape whose outside diameter is hardly larger than that of the rotor's lens. For this reason, the structure of the instant invention is admirably suited for use in hand held instruments where compactness is such a desirable feature. In this connection it should be noted that by rotating the lens itself the mass of the system is greatly reduced from that which would occur if a separate rotor were used to stabilize a non-rotating lens.

A movie camera is perhaps the most common type of optical device wherein instrument vibration will defeat the purposes for which the instrument is intended. For this reason, although suitable for use in a wide variety of instruments, a preferred embodiment of the invention will herein be illustrated as being used in combination with a movie camera.

The foregoing and other objects, features and advantages of this invention will be apparent from the following more particular description of a preferred embodiment thereof illustrated in the accompanying drawings; wherein the same reference numerals refer to the same parts throughout the various views. The drawings are not necessarily intended to be to scale, but rather are presented so as to illustrate the principles of the invention in clear form.

In the drawings:

FIG. 2 is a side sectional view of a lens stabilization device embodying the invention;

FIG. 2a is a sectional view of the embodiment of the invention illustrated in FIG. 2 taken along the lines A—A thereof;

Figure 1:
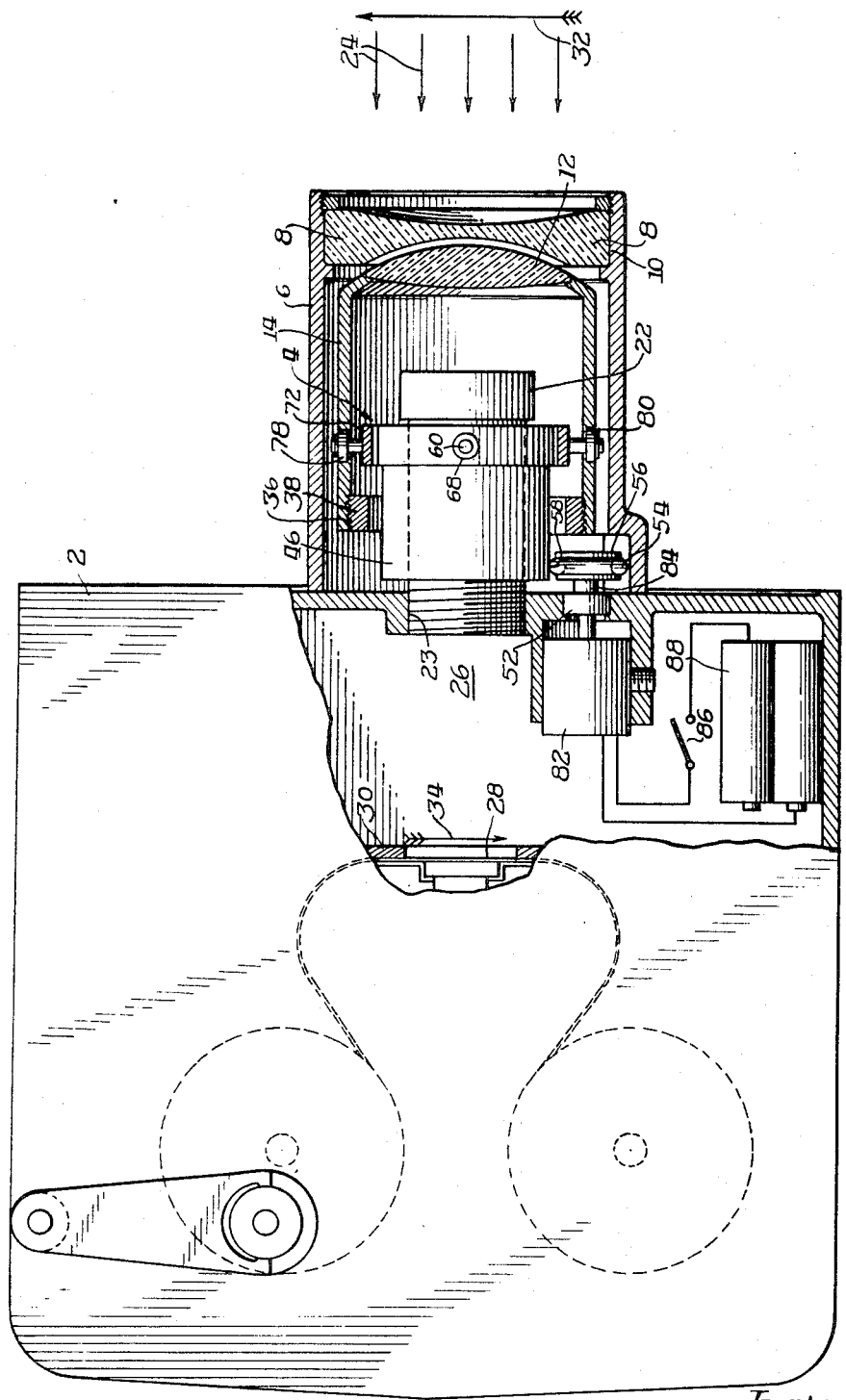
FIG. 1 is a side view of a camera, partially broken away to illustrate the incorporation therein of the embodiment of the invention illustrated in FIG. 2.

Referring now to FIG. 1, a camera 2 has a preferred embodiment of a lens stabilization system 4 mounted in a housing 6 at the forward end of the camera. A lens element is mounted in a groove 10 of the housing as shown in FIG. 2 which illustrates the lens stabilization system 4 as it is broken out of the camera in FIG. 1.

A spherical lens element 12 is retained on the right side of a substantially cylindrical member 14 in FIGS. 1 and 2. As will be more fully described later the lens element 12 has its center of curvature at point 16 which represents the intersection of a horizontal axis 21 and a vertical axis 20 (FIG. 2a). A hollow cylindrical focusing lens housing 22 is threadably affixed at 23 to the housing 6 so that the cylinder's axis corresponds to a horizontal axis 18 in FIG. 2 which also passes through point 16. Hence, light entering from the right in FIG. 1 as illustrated by the arrows 24 is permitted to pass through the optical wedge formed by lens elements 8 and 12; through the focusing lenses in housing 22 (not shown in FIG. 1); through an inner chamber of the camera housing 26 and onto the camera's film 28 located at the focal plane 30 of the stabilized lens system. In this manner, an object 32, which it is desired to photograph, has its image 34 focused on the camera's film 28 as shown in FIG. 1. This is more fully ilustrated schematically in FIG. 3 and will be referred to in more detail later.

The lens retaining cylinder 14 (FIG. 2) is threaded at its rear inner surface 36 for engagement with a balancing inertia ring 38. The balancing inertia ring 38 can be screwed to the left or right in FIG. 2 to counterbalance the weight of the spherical lens element 12 about its center of curvature 16. In this manner the lens retaining cylinder, the balancing inertia ring, and the lens 12 comprise a rotor assembly 40 which is statically and dynamically balanced about the point 16.

Two bearing assemblies 42 and 44 have the inner races thereof mounted upon the focusing lens housing 22. An inner gimbal cylinder 46 is mounted on the outer race of bearing assemblies 42 and 44 for rotation about the focusing lens housing 22. In the preferred embodiment a drive assembly 50 is rotatable on bearings 52 and has a rubber drive ring mounted on a drive wheel 56 thereof so that the rubber drive ring 54 is in contact with a driving surface 58 on the inner gimbal cylinder 46. The drive assembly 50 is driven by a motor 82 through a shaft 84, the motor receiving its electrical potential through a switch 86 from a set of batteries 88.

By rotating the drive wheel 56 the inner gimbal cylinder 46 is rotated about the axis of the cylinder 22. It will be appreciated, however, that although a rubber drive ring has been illustrated, any sutiable drive means can be used. For example, a gearing arrangement or a belt drive can be used to rotate the inner gimbal cylinder. Similarly, although the drive means 50 is illustrated as being driven by a battery powered motor, any suitable power source may be employed without departing from the invention.

Horizontal gimbal pins 60 and 62 (FIG. 2a) located on axis 21 are fastened at one end to the inner gimbal cylinder 46. At their other ends the horizontal pins 60 and 62 are journalled in bearing assemblies 68 and 70, respectively, of a gimbal ring 72. The gimbal ring 72 has vertical gimbal pins 74 and 76 thereof extending along the vertical axis 20 and journalled in bearing assemblies 78 and 80, respectively, of the rotor's lens retaining cylinder 14.

In operation, as soon as the switch 86 is closed the batteries 88 energize the motor 82 whereby the shaft 84 rotates the drive wheel 56. The rubber drive wheel ring 54 engages the surface 58 and spins the inner gimbal cylinder about the horizontal axis 18 of the focusing lens housing 22. The rotation of the inner gimball cylinder is transmitted through the gimbal pins to the retaining cylinder 14 of the rotor assembly 40. In this manner, the rotation of the drive ring 54 is directly transmitted to the inner gimbal cylinder 46, the rotation of which is in turn directly transmitted to the rotor assembly 40. Hence, the rotor assembly begins to rotate as soon as the switch 86 is closed and is up to speed almost immediately thereafter, how soon, of course, depending upon the size of the motor. Consequently, the "warm-up" period required by some of the above noted "floating lens" systems has been eliminated.

As the rotor asembly spins about its spin axis 18 it acts as the rotor of a gyroscope and hence is stable in space about the spin axis. The camera housing 6, however, is free to move with respect to the spin axis 18. The camera housing's freedom of movement is obtained by reason of its ability to pivot about the axes defined by the gimbal pins 60, 62, 74, and 76. In FIG. 2a for example, assume that the lens retaining cylinder 14, although spinning about its axis 18, is maintained stationary with respect to pivotal motion about the horizontal gimbal pin axis 21 in FIG. 2a (appearing as a point in FIG. 2). The camera housing, as represented by the focusing lens housing 22, is free to pivot about the axis 21 by means of rotation of the horizontal gimbal pins 60 and 62 in their respective bearing assemblies 68 and 70. The camera housing is similarly pivotable with respect to the spinning rotor assembly, about an axis passing through the vertical gimbal pins 74 and 76. Consequently, after the rotor has obtained its spatial stability, motion of the camera housing away from the spin axis 18 will cause the axis of the focusing lens housing 22 to become displaced from the rotor's spin axis. Because this will be described in more detail shortly, the vertical displacement about horizontal axis 21 is merely represented in FIG. 2 by a displaced axis 18' representing the displaced axis of the cylinder 22. It should be noted, however, that both the above and following descriptions are based on an instantaneous analysis of the camera housing's motion with respect to the rotor's spin axis. References to horizontal and vertical gimbal axes, for example, are only for convenience, it being understood that they are actually spun about the axis 18' whereby the respective axes are alternately horizontal and then vertical.

Figure 3:
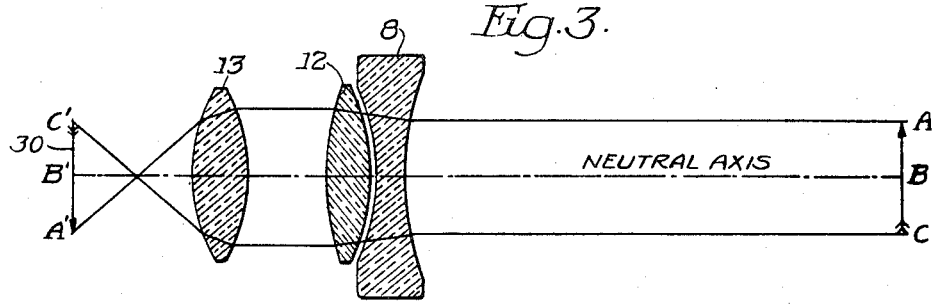
FIG. 3 is a schematic diagram of an image received at the focal plane of a camera as the camera views an object.
Figure 4:
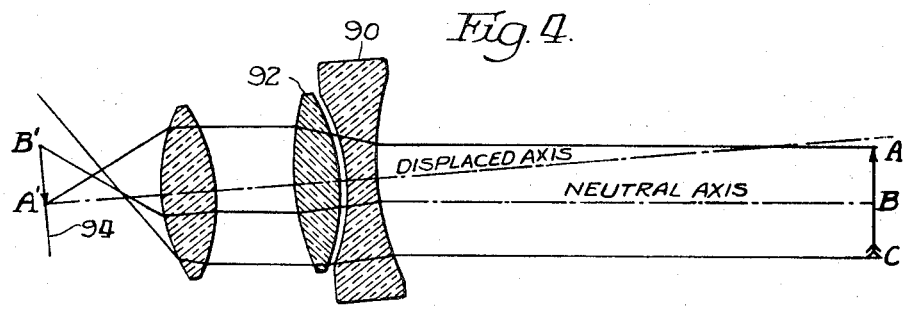
FIG. 4 is a schematic diagram illustrating the image that would be received by an unstabilized lens system when the camera of FIG. 3 is subjected to a vibration.
Figure 5:
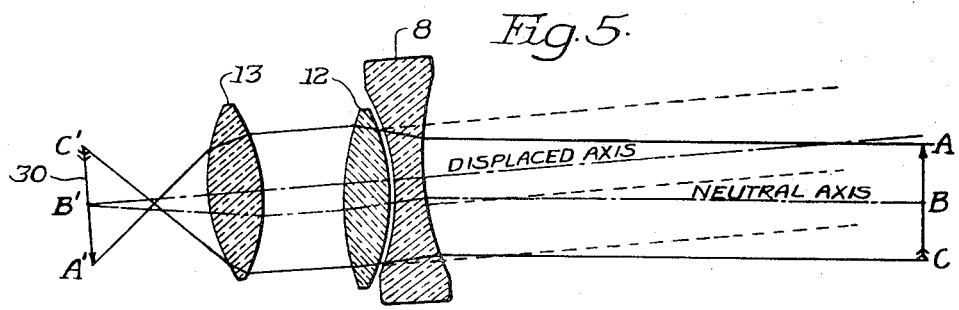
FIG. 5 is a schematic diagram of the image at the focal plane when a camera embodying the invention is subjected to a vibration.

Referring to FIGS. 3, 4, and 5, the optical operation of the above described preferred embodiment of the invention will now be described. Turning first to FIG. 3, the arrow ABC represents an object which it is desired to photograph at a time when the lens stabilization system 4 is in its neutral position, that is, when the axis of the focusing lens housing 22 and the spin axis of the rotor are superposed. At this time, light rays coming from the right in FIG. 3 pass through the lens elements 8 and 12, which form a Boscovich type of wedge, then through the focusing lenses (represented schematically by lens 13) from which an inverted image of the object A'B'C' is focused at the focal plane 30 of the camera.

FIG. 4 shows corresponding lens elements 90 and 92 of a camera which does not have a stabilized optical system. The camera is shown as having been displaced off its neutral axis such as occurs, for example, when a photographer holding a movie camera in his hand walks along the ground while photographing. The distance between the displaced axis and the neutral axis in the schematic, therefore, represents the amount of jiggle which is introduced by the photographer. In this case, the object which is desired to be photographed (arrow ABC) has only a portion of its image formed at the focal plane 94 of the camera having the unstabilized lens system. That is, only the AB portion of the object has an image thereof, A'B', formed at the focal plane. The BC portion of the object is not photographed. This illustration corresponds to the often observed shortcoming of home movies wherein the phtographer successively cuts off the feet and then the heads of the persons he photographs while he is walking.

FIG. 5 illustrates the operation of a camera employing the stabilized lens system of the instant invention. In this case, the photographer has moved the camera off of its neutral axis in the same manner that the camera was moved in connection with FIG. 4. Here the lens element 12 maintains its stability about the neutral axis which in this case is its spin axis. The lens element 8 and the camera's focusing lenses (again represented by the single lens 13) however, are displaced along with the camera housing as shown. With respect to the camera housing, therefore, the lens 8 is fixed, while the other lens 12 is relatively movable although stationary in space. For this reason, the entire image A'B'C' of the object ABC is placed upon the focal plane 30 of the camera just as though the camera had not been displaced. Thus, the lens stabilization system of the invention eliminates the photographic effect of undesired vibrations caused by the photographer. Moreover, even if the platform upon which the photographer is located is subjected to random vibrations in addition to those caused by the photographer the image at the focal plane of the camera will be further compensated whereby the undesired vibrations will not show up in the final photographs.

It will be appreciated by those skilled in the art that although the invention has been illustrated in connection with a movie camera wherein the vibrations were introduced by a photographer, that a similar structure is easily incorporated into binoculars, telescopes, gun sights, or other optical instruments. Moreover, although the invention is particularly well suited for hand held optical instruments wherein weight and compactness are prime requisites the invention is not at all limited thereto. For example, the invention is equally applicable to ground controlled optically guided missile systems.

The invention has been illustrated in connection with a set of gimbals mounted inside of the rotor. It will be appreciated by those skilled in the art, however, that the gimbals can be mounted on the outside of the rotor and not depart from the spirit and scope of the invention. The internally gimballed structure has the advantage of being more compact, but where compactness is of no consequence an externally gimballed structure functions in the same manner as that described above.

When a photographer takes pictures with a movie camera he frequently desires to obtain a panoramic view of a particular scene. Hence, he swings the camera through an arc about his body as an axis. This operation is normally referred to as "panning." If the user of a telescope pans too rapidly the fact is immediately apparent to him because his view is not what he would like it to be. When the viewer intends his efforts to be used in a secondary manner, such as the direction of a gun barrel or the recording of a field of view on film, he is not so immediately aware of his error. In the case of a movie camera, for example, there is no correlation between the ability of the user's eye to adapt to a changing field of view and the ability of the film to record the changing field of view. Indicative of the seriousness of this matter is a recent estimate by a group of trade association members in the camera field that 80% of all home movie film spoilage results from the operator panning too rapidly. It can be appreciated, therefore, that the desire of a photographer to pan is very great. It is for this reason that the stabilized lens system of the instant invention is adapted so that the operator can pan the camera or other optical instrument and still receive the desired stable image at the camera's focal plane. This aspect of the invention will now be described.

The description of the invention thus far, has been directed primarily to low amplitude, high frequency vibrations that are normally associated with the undesirable jiggle which is common in moving picture photographs, for example. Panning, on the other hand, represents an extremely high amplitude, low frequency vibration. So much so, that it is not normally considered a vibration at all and clearly not an undesirable one. In order to permit panning, therefore, the stabilized lens system of the invention is adapted to erect itself so that its spin axis (the neutral axis in FIGS. 3–5) is very slowly brought into alignment with the displaced axis 18' of the cylinder 22. This is accomplished by the gyroscopic action of the above described rotor assembly.

Gyroscopic action is the tendency of a rapidly spinning body turn about a second axis not parallel to the axis of spin, when acted upon by a torque about a third axis. Generally, the second axis is referred to as the precession axis and the third is referred to as the torque axis. Moreover, the rapidly spining body tends to move in a direction which is perpendicular to the force which causes the torque. The reason that the spinning body moves perpendicularly to the direction of the force is because the angular momentum vector of the spinning body moves into alignment with the torque vector caused by the force acting upon the body giving rise to motion about a third axis called the precession axis which is orthogonal to both the momentum and torque vectors.

In the instant case it is the frictional force at the gimbal pins which causes the torque required for the stabilized lens to precess into alignment with the axis of the focusing lens housing 22 during panning. That is, the frictional forces at the gimbal pins create a torque about an axis perpendicular to the rotor's spin axis. Consequently, by gyroscopic action the rotor precesses about an axis perpendicular to the torque axis which, in this case, brings the rotating lens 12 back into alignment with axis 18 of the focusing lens housing 22. As soon as the spin axis of the rotor is aligned with the axis of the focusing lens housing 22, however, there is no torque about the torque axis and precession ceases. It should be appreciated, however, that this friction erection is a relatively slow process as compared with the frequency of the undesired vibrations which have been previously discussed. Consequently, although the lens system of the invention follows the relatively slow panning motion by the photographer, any undesired vibrations occurring during this panning are effectively filtered out, whereby only the desired motion is recorded on the film.

Figure 6:
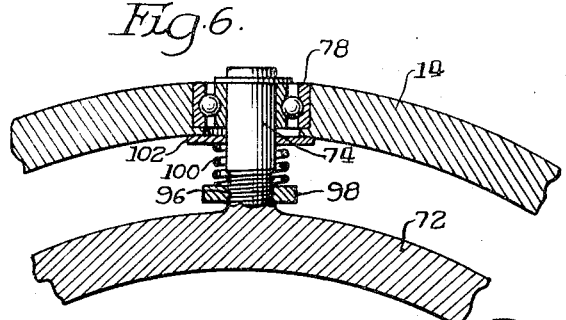
FIG. 6 is a sectional view broken out of FIG. 2a and illustrates a modification of the gimbal pins for obtaining a variable rotor erection rate.

As previously noted it is sometimes desirable to be able to vary the rate at which the stabilized lens erects itself. That is, for faster panning rates it is desirable to have a faster erection rate. A means for accomplishing this variable erection rate is illustrated in FIG. 6 and will now be described. FIG. 6 illustrates the gimbal pin 74 as it is broken out of the embodiment of the invention illustrated in FIG. 2a. The gimbal pin 74, however, is modified by being threaded at its lower portion 96 so as to receive a mating washer 98. A spring 100 is coiled about the gimbal pin 74 and retained between the threaded washer 98 and a second washer 102. The second washer 102 also surrounds the gimbal pin 74, but extends across both the inner and outer races of the bearing assembly 78 in FIG. 6. In operation, motion of the threaded washer 98 upwardly or downwardly alters the force of spring 100 upon the washer 102 and hence the frictional forces between the gimbal pin 74 and the rotor's cylindrical member 14. The other gimbal pins 60, 62, and 76 are similarly adapted, but not so illustrated in the drawings. In this manner, the pivotal connections between the inner gimbal cylinder and the rotor can be made more or less free depending upon the position of the washers 98 on their respective gimbal pin connectors. Hence, when the instrument is panned so that the camera housing axis 18' becomes displaced from the spin axis 18 the frictional forces causing erection may be made greater whereby erection occurs at a faster rate. For example, if it is desired to pan the instrument more rapidly it is merely necessary to tighten down on the washers 98, whereby the stabilized lens 12 will more rapidly follow the motion of the focusing lens housing 22.

The panning rate adjustment feature of the instant invention has been described in connection with the adjustable spring 100. It will be appreciated, however, that other types of well known friction adjustment devices can also be used, such as, for example, spring contact fingers having one end thereof fastened to the gimbal pin and other end resting upon the inner surface of cylinder 14 in FIG. 6.

The above described preferred embodiment of the invention, therefore, not only provides a lens stabilization system that is sensitive to high frequency, low amplitude vibrations, but also provides a system that permits a stabilized optical image at its focal plane over a wide range of panning rates. Moreover, the stabilized lens is not subject to nutational tendencies even though the instrument undergoes severe jarring motions. In addition, the stabilized lens is operationally stabilized at almost the instant that power is applied to its drive means.

For ease of illustration the action of the preferred embodiment has been described in connection with panning and vibration in a vertical plane. However, it will be understood that the embodiment disclosed herein works equally well when the motion resulting from either panning or vibration has only a horizontal component or has both a vertical and a horizontal component. Also, it will be apparent to those skilled in the art that although the above described preferred embodiment of the invention has been described in connection with a movie camera that the invention is readily adaptable to other optical instruments. For example, a lens stabilization system such as provided by the instant invention, when coupled to the objective lens of zoom binocular, will permit this desirable type of binocular to be used even on the high seas while a ship is pitching and rolling and subjected to severe engine vibrations.

While the invention has been particularly shown and described with reference to a preferred embodiment thereof, it will be understood by those skilled in the art that various changes in form and details may be made therein without departing from the spirit and scope of the invention.

The embodiments of the invention in which an exclusive property or privilege is claimed are defined as follows:

1. A lens stabilization system comprising:
a rotor having a lens mounted thereon;
a gimbal suspension means;
pivotal connecting means connecting said gimbal suspension to said rotor;
and means to rotate said gimbal suspension means, the rotation of said gimbal suspension means being transmitted to said rotor through said connecting means, and said lens being located on said rotor so that said lens spins about a spin axis at substantially the same speed as said gimbal suspension means.

2. The apparatus of claim 1 wherein said gimbal suspension means has at least two degrees of freedom with respect to said spin axis of said lens.

3. A lens stabilization system comprising:
a rotor having a spherically surfaced lens mounted thereon;
a gimbal suspension means having at least two degrees of freedom, each degree of freedom being about a different one of axes which intersect at the center of curvature of said lens;
pivotal connecting means connecting said gimbal suspension means to said rotor;
and means to rotate said gimbal suspension means, the rotation of said gimbal suspension means being transmitted to said rotor through said connecting means, said lens being located on said rotor so that said lens spins about a spin axis at substantially the same speed as said gimbal suspension means.

4. The apparatus of claim 3 wherein said rotor substantially surrounds said gimbal suspension means.

5. The apparatus of claim 3 including an inertia member located on said rotor;
and means for adjusting the position of said inertia member along the spin axis of said rotor.

6. The apparatus of claim 5 wherein said rotor substantially surrounds said gimbal suspension means.

7. The apparatus of claim 3 including a means for varying the friction at the pivots of said gimbal suspension means.

8. A lens stabilization system comprising:
a rotor having a lens mounted thereon;
a support means;
a first gimbal ring rotatable with respect to said support means;
a second gimbal ring;
first pivotal connecting means connecting said second gimbal ring to said first gimbal ring so that said second gimbal ring is rotatable with said first gimbal ring, but pivotal with respect to said first gimbal ring about an axis defined by said first pivotal connecting means;
second pivotal connecting means connecting said rotor to said second gimbal ring so that said rotor is rotatable with said first and second gimbal rings, but pivotal with respect to said second gimbal ring about an axis orthogonal to the axis about which said second gimbal ring pivots with respect to said first gimbal ring;
and means for rotating said first gimbal ring with respect to said support means and thereby said second gimbal ring and said rotor with respect to said support means, said lens being located on said rotor so that said lens spins about the spin axis at substantially the same speed as said first gimbal ring rotates with respect to said support means.

9. The apparatus of claim 8 wherein the centers of said gimbal rings are located at the center of curvature of said lens.

10. The apparatus of claim 9 wherein said rotor substantially surrounds said gimbal rings.

11. The apparatus of claim 9 including an inertia member located on said rotor;
and means for adjusting the position of said inertia member along the spin axis of said rotor.

12. The apparatus of claim 11 wherein said rotor substantially surrounds said gimbal rings.

13. The apparatus of claim 9 including means for varying the frictional forces acting on said pivotal connecting means.

14. In an optical instrument the combination comprising:
a housing;
a first lens mounted in said housing;
a rotor having a second lens mounted thereon, said rotor being located within said housing so that said first and second lenses form an optical wedge;
a gimbal suspension means;
pivotal connecting means connecting said gimbal suspension means to said rotor;
and means to rotate said gimbal suspension means, the rotation of said gimbal suspension means being transmitted to said rotor through said connecting means, said second lens being located on said rotor so that said second lens spins about a spin axis at substantially the same speed as said gimbal suspension.

15. In an optical instrument the combination comprising:
a housing;
a first lens mounted in said housing;
a rotor having a second lens mounted thereon, said rotor being located within said housing so that said first and second lenses form an optical wedge;
a gimbal suspension means having at least two degrees of freedom and located so that its center is at the center of curvature of said second lens;
pivotal connecting means connecting said gimbal suspension means to said rotor;
and means rotatably mounted in said housing for rotating said gimbal suspension means, the rotation of said gimbal suspension means being transmitted to said rotor through said pivotal connecting means, said second lens being located on said rotor so that said lens spins about a spin axis at substantially the same speed as said gimbal suspension means.

16. The apparatus of claim 15 wherein said rotor substantially surrounds said gimbal suspension means.

17. The apparatus of claim 15 including an inertia member located on said rotor;
and means for adjusting the position of said inertia member along the spin axis of said rotor.

18. The apparatus of claim 15 including means for adjusting the frictional forces on said pivotal connecting means.

19. In a moving picture camera which is adapted to focus light rays from an object onto a film station, the combination comprising:
a camera housing which includes an object portion and an image portion;

a first lens mounted in said object portion of said housing, said film station being at said image portion of said housing;

a rotor adapted to spin about a spin axis and having a second lens mounted coaxially with said spin axis, said rotor being located within said housing so that said first and second lenses form an optical wedge whereby an image from an object is focused on said film station irrespective of relative motion between said lenses;

a gimbal suspension means having at least two degrees of freedom and located so that its center is at the center of curvature of said second lens;

pivotal connecting means connecting said gimbal suspension means to said rotor;

and means rotatably mounted in said camera housing to rotate said gimbal suspension means about a drive axis the rotation of said gimbal suspension means being transmitted to said rotor through said pivotal connecting means so that said lens spins about said spin axis at substantially the same speed as said gimbal suspension means.

20. The apparatus of claim 19 wherein said rotor substantially surrounds said gimbal suspension means.

21. The apparatus of claim 19 including an inertia member located on said rotor;

and means for adjusting the position of said inertia member along the spin axis of said rotor.

22. The apparatus of claim 19 including a means for adjusting the friction forces on said pivotal connecting means for varying the rate at which said rotor preceses into coaxial superposition with said drive axis when said drive axis is divergent from said spin axis.

References Cited
UNITED STATES PATENTS

| | | |
|---|---|---|
| 1,402,064 | 1/1922 | Gray. |
| 1,586,070 | 5/1926 | Cooke. |
| 2,959,088 | 11/1960 | Rantsch. |
| 3,035,477 | 5/1962 | Ten Bosch et al. |

JULIA E. COINER, *Primary Examiner.*